(12) United States Patent
Malloy

(10) Patent No.: US 7,757,517 B2
(45) Date of Patent: Jul. 20, 2010

(54) PROTECTIVE SLEEVE WITH KNITTED OPENING AND METHOD ON CONSTRUCTION

(75) Inventor: Cassie M. Malloy, Blue Bell, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 16 days.

(21) Appl. No.: 12/196,375

(22) Filed: Aug. 22, 2008

(65) Prior Publication Data

US 2009/0049868 A1 Feb. 26, 2009

Related U.S. Application Data

(60) Provisional application No. 60/957,494, filed on Aug. 23, 2007.

(51) Int. Cl.
*D04B 1/22* (2006.01)

(52) U.S. Cl. ...................................................... 66/170

(58) Field of Classification Search ............... 66/178 R, 66/179, 180, 181, 182, 183, 184, 196, 185, 66/186
See application file for complete search history.

(56) References Cited

U.S. PATENT DOCUMENTS

| | | | | |
|---|---|---|---|---|
| 1,786,862 A * | 12/1930 | Mouthe | ..................... | 66/178 R |
| 4,961,418 A * | 10/1990 | McLaurin-Smith | .......... | 602/21 |
| 4,967,419 A * | 11/1990 | Elliott | .............................. | 2/16 |
| 5,413,149 A | 5/1995 | Ford et al. | | |
| 5,675,992 A * | 10/1997 | Wrightenberry | .......... | 66/178 R |
| 5,778,702 A * | 7/1998 | Wrightenberry | .......... | 66/178 R |
| 6,108,820 A * | 8/2000 | Bernhardt | ....................... | 2/239 |
| 6,324,698 B1 * | 12/2001 | Freeman | ........................ | 2/239 |
| 6,978,643 B2 * | 12/2005 | Akers et al. | ................... | 66/170 |
| 7,200,872 B2 * | 4/2007 | Gregory | ........................ | 2/170 |
| 7,469,563 B2 * | 12/2008 | Wahlgren et al. | ......... | 66/169 R |
| 2004/0154070 A1 | 8/2004 | Gregory | | |

FOREIGN PATENT DOCUMENTS

| | | |
|---|---|---|
| JP | 11-311396 A | 11/1999 |
| WO | WO 99/04194 A1 | 1/1999 |
| WO | WO 04/001780 A2 | 12/2003 |
| WO | WO 2007/084971 A2 | 7/2007 |

* cited by examiner

*Primary Examiner*—Danny Worrell
(74) *Attorney, Agent, or Firm*—Robert L. Stearns; Dickinson Wright, PLLC

(57) ABSTRACT

A knit tubular protective sleeve and method of construction thereof provides a continuous and seamless tubular wall knit from one or more yarns extending between opposite open ends of the sleeve. At least one opening is integrally knit within the tubular wall between the ends. The opening has a circumferentially continuous, knit outer periphery.

15 Claims, 4 Drawing Sheets

PROTECTIVE SLEEVE WITH KNITTED OPENING AND METHOD ON CONSTRUCTION

CROSS-REFERENCE TO RELATED APPLICATION

This application claims the benefit of U.S. Provisional Application Ser. No. 60/957,494, filed Aug. 23, 2007, which is incorporated herein by reference in its entirety.

BACKGROUND OF THE INVENTION

1. Technical Field

This invention relates generally to sleeves for protecting elongate members and more particularly to knit tubular protection sleeves.

2. Related Art

Knit tubular sleeves that provide protection from external elements and that provide a barrier to heat radiation from elongate members, such as exhaust pipes, wires and tubing, contained within the sleeves, are known. The sleeves are commonly knit from abrasion resistant and/or heat resistant and/or fire retardant yarns to withstand relatively high temperatures and to allow portions of the sleeve to expand radially. The tubular sleeves are commonly constructed having a continuous, closed wall, such that the sleeves must be slid in sock-like fashion over the item being protected. Given the closed-wall construction, sometimes multiple sleeves are used in combination with one another to accommodate protrusions, e.g., sensors, or members branching from the item being protected, wherein adjacent sleeves are fastened to one another on opposite sides of the respective obstacle. This complicates the assembly process and adds labor/component cost. Otherwise, to avoid using multiple sleeves, some sleeves have an opening formed in the closed wall to accommodate the respective protrusion and/or member branching from the item being protected, or to facilitate locating the sleeve in a stationary position relative to a protrusion from the item being protected. In order to form the opening, or in some cases multiple openings, the wall must be slit, thereby resulting in frayed, loose ends of the yarns forming the closed wall. This generally results in unraveling of the yarns forming the sleeve, thereby reducing its ability to perform as intended and reducing its useful life.

Accordingly, to reduce the risk of degrading the usefulness of the sleeve, it is known to form openings in secondary cutting and sewing operations. In the secondary operations, the cut edges forming the opening are sewn to reduce the likelihood of their unraveling. Unfortunately, these secondary operations add cost to the manufacturing process. In addition, the sewn edges provide a potential origin for future unraveling, should the stitches come loose during use.

Knit sleeves manufactured in accordance with the present invention, among other things, overcome or greatly minimize any limitations of the known sleeves described above.

SUMMARY OF THE INVENTION

A tubular protective sleeve constructed according to one aspect of the invention has a continuous and seamless tubular wall knit from at least one yarn extending between opposite open ends of the sleeve. At least one opening is integrally knit within the tubular wall between the ends. The opening has a circumferentially continuous, knit outer periphery.

According to another aspect of the invention, the opening is bounded by uncut, continuous portions of the at least one yarn forming the wall.

According to another aspect of the invention, the opening can be knit having any suitable size and shape.

According to yet another aspect of the invention, the sleeve wall and opening can be knit using any desired knit pattern and stitch type.

According to yet another aspect of the invention, the at least one yarn forming the tubular wall can be provided in any desired size and in any suitable material, including flame resistant and flame retardant materials.

According to yet another aspect of the invention, any number of knit openings can be constructed between the opposite ends of the sleeve.

According to yet another aspect of the invention, the sleeve tubular wall can have knit openings arranged to align with one another upon the tubular wall being reverse folded upon itself.

According to yet another aspect of the invention, the opposite ends of the tubular wall can be finish knit ends.

According to yet another aspect of the invention, a method of constructing a tubular sleeve is provided. The method includes providing knitting machine and knitting a tubular sleeve on the machine. Further, the method includes knitting at least one opening between opposite ends of the sleeve while knitting the tubular sleeve.

According to yet another aspect of the invention, the method of construction includes providing the knitting machine as a flat bed weft knitting machine.

According to yet another aspect of the invention, the method includes reverse folding the tubular sleeve to provide the sleeve with a plurality of tubular walls.

According to yet another aspect of the invention, the method includes knitting a plurality of openings between opposite ends of the tubular wall and reverse folding the tubular wall to align at least a pair of the openings with one another.

BRIEF DESCRIPTION OF THE DRAWINGS

These and other aspects, features and advantages of a knit tubular sleeve constructed in accordance with the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
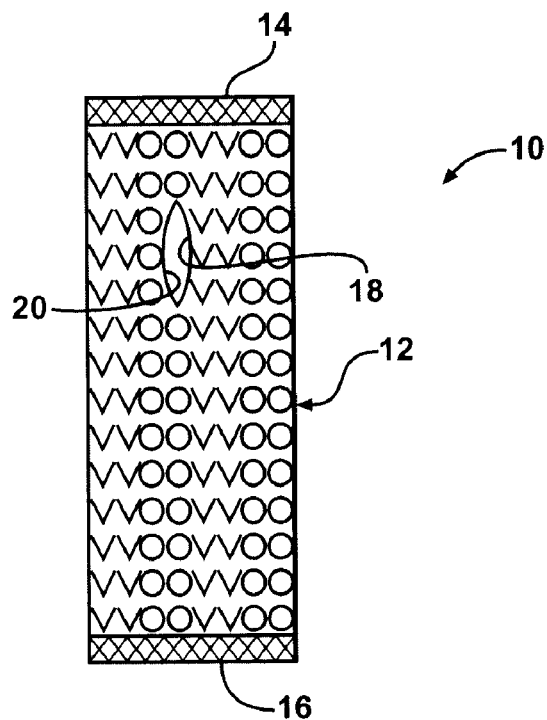
FIG. 1 is a schematic plan view of a tubular sleeve constructed according to one aspect of the invention.

Referring in more detail to the drawings, FIG. 1 illustrates schematically a knit tubular sleeve 10 constructed according to one aspect of the invention for protecting elongate members, such as an exhaust pipe, fluid carrying conduit or a wire harness, for example. The sleeve 10 has a seamless tubular wall 12 extending between opposite ends 14, 16, wherein the ends 14 are preferably finish knit ends, with at least one opening 18 knit in a single continuous knitting operation between the opposite finish knit ends 14, 16. The opening 18 can be knit having any size and shape using a predetermined series of needle and stitch transfers, as desired, to accommodate a projection or item branching from the elongate member being protected. As such, the opening 18 is formed as the tubular sleeve 10 is constructed in a knitting process, thereby negating the necessity to perform secondary operations to form the opening 18. In addition, with the opening 18 being knit integrally in a single knitting operation, the opening 18 is formed with at least one continuous, uncut yarn used to construct the sleeve. Accordingly, the one or more yarns forming a periphery 20 of the opening 18 are knit directly into the wall 12, remain uncut about the periphery of the opening 18, and thus, do not unravel, thereby providing the sleeve 10 with a long and useful life.

Figure 2:
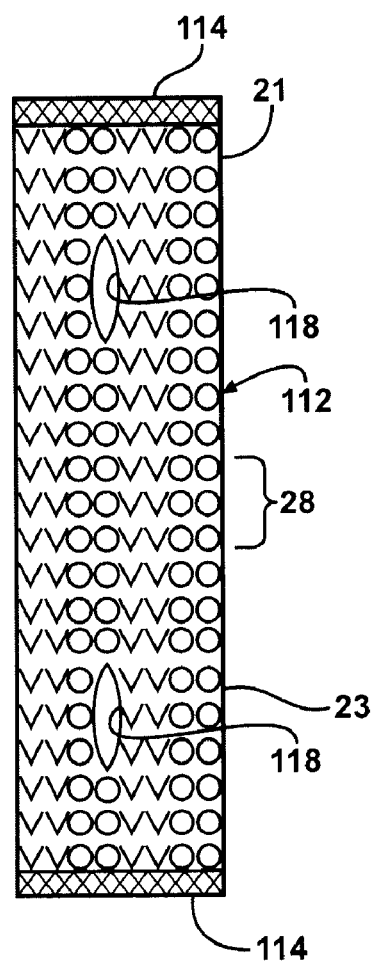
FIG. 2 is a schematic side view of a tubular sleeve constructed according to another aspect of the invention shown in an unfolded state.
Figure 3:
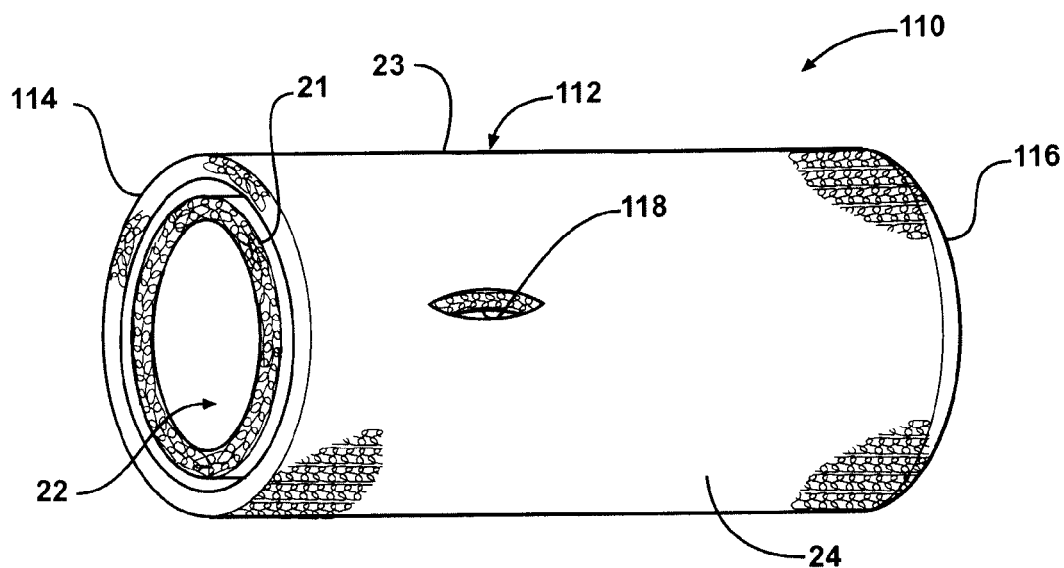
FIG. 3 is a schematic perspective view of the tubular sleeve of FIG. 2 shown in a reverse folded state.

The tubular wall 12 can be knit having a single wall (FIG. 1). Otherwise, as shown in an alternate embodiment, a sleeve 110 can be knit in a process to provide a tubular wall 112 having a plurality of overlapping layers 21, 23 (FIG. 3). Where the sleeve 110 has two or more walls or layers, one end of the tubular sleeve can be reverse folded to provide the desired number of overlapping walls. When a reverse folding process is used to construct the sleeve, one end 114 can be provided having a pair of finished, knit, free ends arranged adjacent one another, while the other end 116 can be provided as a closed end of the overlapping material located generally near a mid-portion 28 (FIG. 2) of the unfolded wall 112. The reverse folded sleeve 110 is constructed having a plurality of openings 118 knit integrally along the length of the tubular wall 112 at predetermined axially spaced locations to one another, such that when one end 114 of the tubular wall 112 (FIG. 2) is reverse folded, at least some of the openings 118 are aligned or registered with one another (FIG. 3) to provide a single through opening extending from an inner cavity 22 of the sleeve 110, through the overlapping layers, to an outer surface 24 of the sleeve 110.

Figure 4:
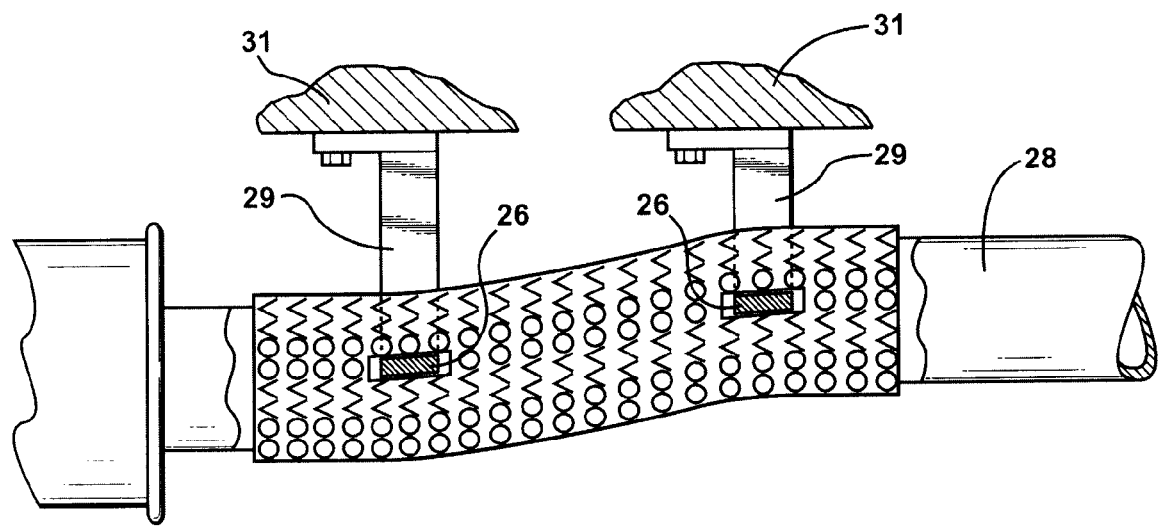
FIG. 4 is a schematic side view of a sleeve constructed in accordance with the invention shown disposed about an elongate member having projections extending therefrom.

In the manufacture of the tubular sleeve 10, 110, the one or more yarns used can be provided as monofilaments and/or multifilaments of any suitable Tex and material, including fire resistant and/or fire retardant (FR) yarns. If high temperature ratings are desired along with FR capabilities, then some presently preferred yarn materials include m-Aramid (Nomex, Conex, Kermel), p-aramid (Kevlar, Twaron, Technora), PEI (Ultem), PPS, and PEEK, for example. Any number of openings 18, 118 can be knit along the length of the sleeve 10, 110, depending on the number of projections 26 extending from the sleeve 10, 110. As shown in FIG. 4, the projections 26 could be brackets 29 for attaching an exhaust pipe 28 to a frame 31 of a vehicle, for example, or sensors, such as oxygen sensors arranged in communication with an exhaust pipe 28, for example. Otherwise, the projections 26 could be incorporated to facilitate locating and maintaining the sleeve 10, 110 in its intended axial position along the length of the elongate member being protected.

Figure 5:
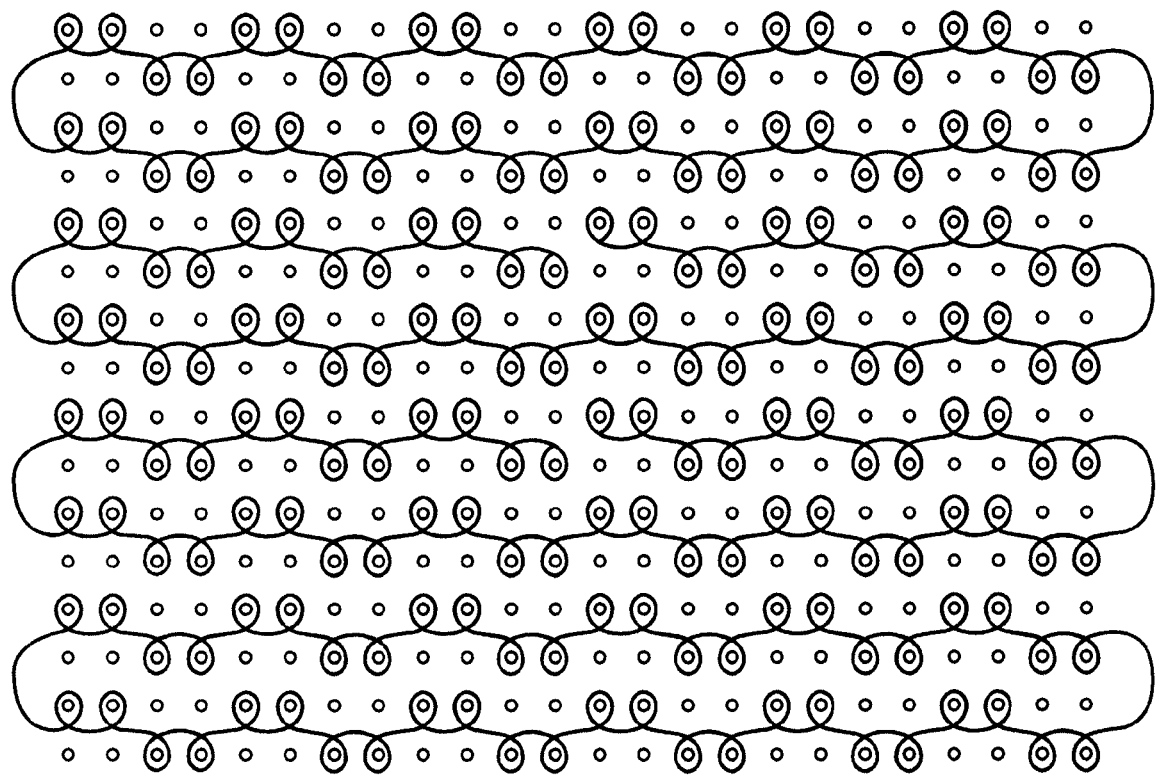
FIG. 5 is a portion of a knit stitch pattern for knitting an integral opening in a tubular sleeve according to one aspect of the invention.
Figure 6:
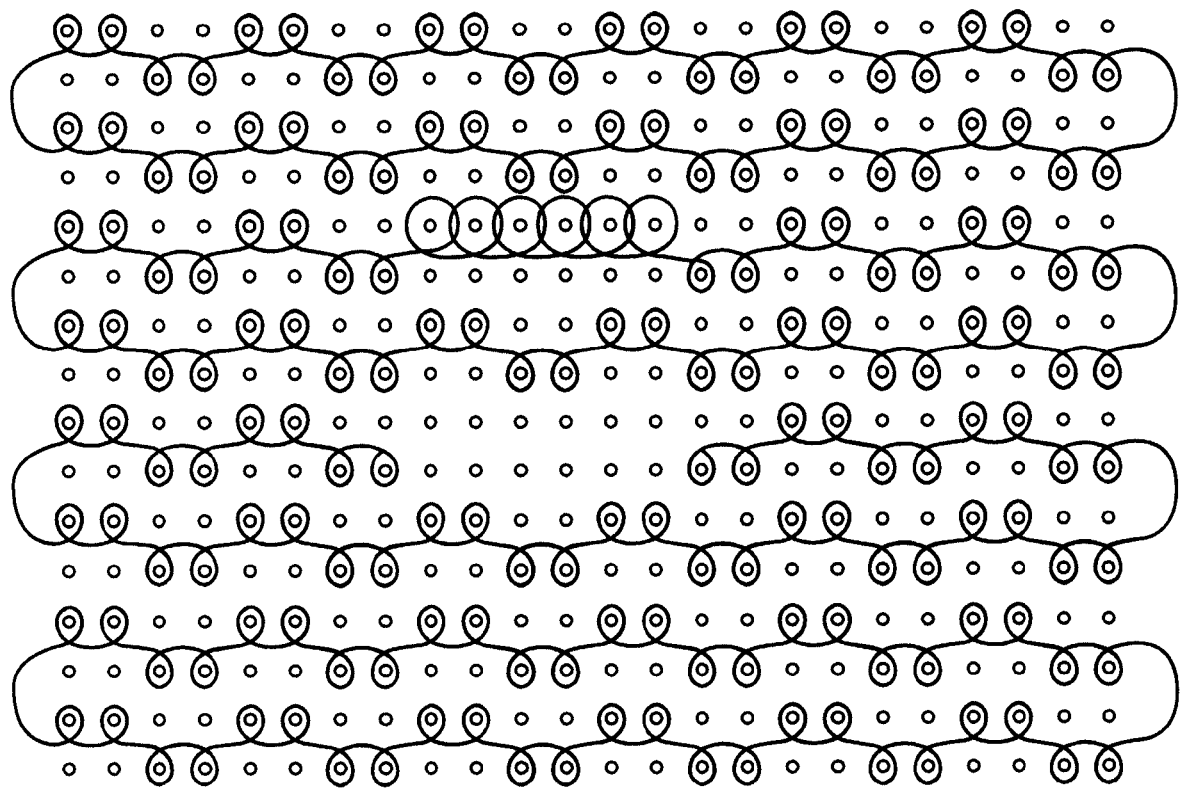
FIG. 6 is a portion of a knit stitch pattern for knitting another integral opening with a tubular sleeve according to one aspect of the invention.

In constructing the sleeve 10, 110, a knitting machine is provided, such as a computerized flat bed weft knitting machine (e.g., Shima Seiki SSG Machine), for example. The sleeve 10, 110 is thus constructed as a flat knit material and continuously knit into the seamless tubular wall 12. During the knitting operation, the openings 18, 118 are knit within the predetermined locations along the length of the wall, such that the one or more yarns forming the openings 18, 118 are knitted as continuous, uninterrupted and uncut yarns. As such, no secondary operations are needed to form the openings 18, 118. To initiate the opening, the yarn or yarns are prevented from unraveling by using a "bind off" stitch. Accordingly, the yarns forming the openings 18, 118 do not have loose free ends that would be prone to unraveling. As such, the finished sleeve 10, 110 exhibits a long and useful life. Further, the yarns can be knit in any suitable stitch and pattern. For example, as shown schematically in FIGS. 1 and 2, the pattern could be a 2×2 pattern, however, they could be knit in any suitable pattern, such as a 1×1, 2×1, 3×1, or 3×3, for example, as desired. The knitting can be performed to provide an integrally knit slit type opening of any suitable length, such as illustrated in FIGS. 1-3, and in a knit pattern, by way of example and without limitation, as shown in FIG. 5. The knitting can be performed to provide any suitable shape opening, such as a generally round or square shaped, such as illustrated schematically in FIG. 4, and using a knit pattern, by way of example and without limitation, as shown in FIG. 6. It should be recognized that the generally square opening could be formed other than square, such as rectilinear, or otherwise, depending on the series of needle and stitch transfers employed.

Obviously, many modifications and variations of the present invention are possible in light of the above teachings. It is, therefore, to be understood that within the scope of the appended claims, the invention may be practiced otherwise than as specifically described.

What is claimed is:

1. A sleeve for protecting elongate members, comprising:
   a tubular wall extending between opposite open ends, said tubular wall being constructed from a plurality of yarns interlinked with one another by a plurality of knit stitches, said wall having one side with a pair of opposite longitudinally extending edges and another side with a pair of opposite longitudinally extending edges with opposite pairs of edges being at least partially knit together; and
   at least one opening integrally knit in said tubular wall between said opposite open ends, said opening extending longitudinally along said tubular wall and having a circumferentially continuous, knit outer periphery.

2. The sleeve of claim 1 wherein said tubular wall is circumferentially continuous and said at least one opening is formed between at least one of the pair of edges.

3. The sleeve of claim 1 wherein said circumferentially continuous, knit outer periphery is knit concurrently with said tubular wall from at least some of said plurality of yarns.

4. The sleeve of claim 3 wherein said circumferentially continuous, knit outer periphery is formed from uncut ones of said plurality of yarns.

5. The sleeve of claim 1 wherein each of said plurality of yarns extends continuously between said ends.

6. The sleeve of claim 1 wherein said ends are finish knit.

7. The sleeve of claim 1 wherein said tubular wall has a pattern of said knit stitches, said at least one opening being configured by a change in said pattern.

8. The sleeve of claim 1 wherein said tubular wall has a pair of said openings, one of said ends being reverse folded to provide said tubular wall with an inner wall and an outer wall, said inner wall having one of said pair of openings and said outer wall having the other of said pair of openings, said pair of openings being registered with one another to provide a single opening extending through said inner wall and said outer wall.

9. A method of constructing a tubular sleeve for protecting an elongate member, comprising:
   providing a flat bed knitting machine;
   knitting a tubular sleeve having one side with opposite longitudinally extending edges knit on one bed of the flat bed knitting machine and another side with opposite longitudinally extending edges knit on an opposite side of the flat bed knitting machine with opposite pairs of the longitudinally extending edges being at least partially knit together on the flat bed knitting machine with a knit pattern extending between opposite open ends on the machine; and knitting at least one longitudinally extending opening between said opposite open ends while continuously knitting the tubular sleeve.

10. The method of claim 9 further including weft knitting the tubular sleeve.

11. The method of claim 9 further including knitting the tubular sleeve having a circumferentially seamless wall with said at least one opening extending between at least one of the pair of edges.

12. The method of claim 9 further including knitting a pair of the openings between the opposite ends and reverse folding one of the ends and registering the pair of opening with one another to form a single opening through an overlapped inner and outer layer of the sleeve.

13. The method of claim 9 further including finish knitting the opposite ends.

14. The method of claim 9 further including knitting the opening by changing the knit pattern on the knitting machine.

15. The method of claim 14 further including initiating at least one of the openings by forming a bind off knit pattern.

\* \* \* \* \*